(12) United States Patent
Ianev et al.

(10) Patent No.: US 12,004,254 B2
(45) Date of Patent: Jun. 4, 2024

(54) CORE NETWORK NODE AND METHOD

(71) Applicant: NEC Corporation, Tokyo (JP)

(72) Inventors: Iskren Ianev, Lower Earley (GB);
Toshiyuki Tamura, Tokyo (JP);
Linghang Fan, Woking (GB)

(73) Assignee: NEC CORPORATION, Tokyo (JP)

( * ) Notice: Subject to any disclaimer, the term of this patent is extended or adjusted under 35 U.S.C. 154(b) by 401 days.

(21) Appl. No.: 17/414,764

(22) PCT Filed: Dec. 13, 2019

(86) PCT No.: PCT/JP2019/048866
§ 371 (c)(1),
(2) Date: Jun. 16, 2021

(87) PCT Pub. No.: WO2020/145030
PCT Pub. Date: Jul. 16, 2020

(65) Prior Publication Data
US 2022/0070963 A1 Mar. 3, 2022

(30) Foreign Application Priority Data
Jan. 9, 2019 (EP) .................................... 19151050

(51) Int. Cl.
*H04W 76/28* (2018.01)
*H04L 41/14* (2022.01)

(52) U.S. Cl.
CPC ............. *H04W 76/28* (2018.02); *H04L 41/14* (2013.01)

(58) Field of Classification Search
CPC ............................... G16Y 10/75; H04W 12/08
USPC ....................................... 370/329; 455/456.1
See application file for complete search history.

(56) References Cited

U.S. PATENT DOCUMENTS

| | | | |
|---|---|---|---|
| 2012/0115454 A1 | 5/2012 | Liao | |
| 2019/0053274 A1* | 2/2019 | Kim | ..................... H04L 5/0044 |
| 2019/0141563 A1 | 5/2019 | Ianev et al. | |
| 2020/0092426 A1 | 3/2020 | Hietalahti et al. | |
| 2020/0252813 A1* | 8/2020 | Li | ........................ G06Q 20/382 |
| 2021/0219238 A1* | 7/2021 | Sharma | ............. H04W 36/0083 |

FOREIGN PATENT DOCUMENTS

| | | |
|---|---|---|
| EP | 2451228 A1 | 5/2012 |
| WO | 2017170123 A1 | 10/2017 |
| WO | 2018/169523 A1 | 9/2018 |

OTHER PUBLICATIONS

International Search Report for PCT Application No. PCT/JP2019/048866, dated Feb. 5, 2020.
English translation of Written opinion for PCT Application No. PCT/JP2019/048866, dated Feb. 5, 2020.

(Continued)

*Primary Examiner* — Kiet M Doan

(57) ABSTRACT

The current disclosure proposes per UE customization of the UE DRX/eDRX and PSM based on the analytical results from NWDAF. It also proposes a new UE policy element for UE analytics reporting—UE Analytics Reporting Policy that is a set of reporting rules and is defined by the PCF based on analytical results from NWDAF. The UEARP then is delivered or updated in the UE during registration.

4 Claims, 8 Drawing Sheets

(56) References Cited

OTHER PUBLICATIONS

3rd Generation Partnership Project, "Technical Specification Group Services and System Aspects; Study of Enablers for Network Automation for 5G (Release 16)", 3GPP TR 23.791 V1.1.0 (Oct. 2018), pp. 1-98.

3rd Generation Partnership Project, "3rd Generation Partnership Project: Technical Specification Group Services and System Aspects; Vocabulary for 3GPP Specifications (Release 15)", 3GPP TR 21.905 V15.0.0 (Mar. 2018), pp. 1-64.

3rd Generation Partnership Project, "Technical Specification Group Services and System Aspects; System Architecture for the 5G System; Stage 2 (Release 15)", 3GPP TS 23.501 V15 3.0 (Sep. 2018), pp. 1-226.

3rd Generation Partnership Project, "Technical Specification Group Services and System Aspects; Procedures for the 5G System; Stage 2 (Release 15)", 3GPP TS 23.502 V15.3.0 (Sep. 2018), pp. 1-329.

3rd Generation Partnership Project, "Technical Specification Group Services and System Aspects; Study of Enablers for Network Automation for 5G (Release 16)", 3GPP TR 23.791 V2.0.0 (Dec. 2018), pp. 1-121.

3rd Generation Partnership Project, "Technical Specification Group Services and System Aspects: System Architecture for the 5G System: Stage 2 (Release 15)", 3GPP TS 23.501 V15.4.0 (Dec. 2018), pp. 1-236.

Christian Mannweiler (Editor), "5G Network Architecture for diverse services, use cases, and applications in 5G and beyond Deliverable D2.2 Intial overall architecture and concepts for enabling innovations", 5GPPP, H2020-ICT-2016-2, 5G-MoNArch .Project No. 761445, XP055612308, Jul. 3, 2016, pp. 1-111, Version 1.0.

JP Office Action for JP Application No. 2021-539396, dated Jun. 7, 2022 with English Translation.

Presentation of TR 23.791: 'Study of Enablers for Network Automation for 5G (Rel-16)' for approval, 3GPP TSG SA Meeting #SP-82 SP-181108. Dec. 7, 2018, pp. 1-8.

Japanese Office Communication for JP Application No. 2021-539396 dated Sep. 6, 2022 with English Translation.

"Presentation of TR 23.791: 'Study of Enablers for Network Automation for 5G (Rel-16)' for approval", 3GPP TSG SA Meeting #SP-82 SP-181108, Dec. 7, 2018, pp. 28-29, 78-84.

\* cited by examiner

CORE NETWORK NODE AND METHOD

This application is a National Stage Entry of PCT/JP2019/048866 filed on Dec. 13, 2019, which claims priority from European Patent Application 19151050.2 filed on Jan. 9, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to customisation of UE mobility and connection management in the so-called '5G' (or 'Next Generation') systems.

BACKGROUND ART

Abbreviations

5GC 5G Core Network
5GS 5G System
5G-AN 5G Access Network
5G-S-TMSI 5G S-Temporary Mobile Subscription Identifier
AMF Access and Mobility Management Function
AN Access Network
AS Access Stratum
DN Data Network
DRX Discontinuous Reception
eDRX extended Discontinuous Reception
eNA enablers for Network Automation
GCF Global Certification Forum
IMSI International Mobile Subscriber Identity
MNG-RAN Master Next Generation Radio Access Network
NAS Non-Access Stratum
NEF Network Exposure Function
NF Network Function
NG-RAN Next Generation Radio Access Network
NR New Radio
NRF Network Repository Function
NWDAF Network Data Analytics Function
OAM Operation And Maintenance
PCF Policy Control Function
PDU Protocol Data Unit
PLMN Public land mobile network
PSM Power Saving Mode
(R)AN (Radio) Access Network
RAT Radio Access Technology
RFSP RAT/Frequency Selection Priority
RRC Radio Resource Control
S-NSSAI Single Network Slice Selection Assistance Information
SUCI Subscription Concealed Identifier
SUPI Subscription Permanent Identifier
UDM Unified Data Management
UDR Unified Data Repository
UE User Equipment
UEARP UE Analytics Reporting Policy
VPLMN Visited Public land mobile network

Definitions

For the purposes of the present document, the terms and definitions given in 3GPP TR 21.905 [1] and the following apply. A term defined in the present document takes precedence over the definition of the same term, if any, in 3GPP TR 21.905 [1].

3GPP SA2 Working Group is working on eNA (enablers for Network Automation). The FIG. 1 from TR23.791 shows general framework for 5G network automation in Release 16, depicting that the NWDAF should be able to collect data from the operator OAM, AFs and 5GC network functions (NFs). Based on the data collection, the NWDAF performs data analysis and provides the analytical result to the AF, the 5GC NFs and the OAM.

As part of this study, exchange of information between NWDAF and OAM may be defined. Interactions between OAM and NWDAF shall be based on use case requirements. The OAM could be a potential consumer or provider of the information for the NWDAF. The definition of such interaction shall be coordinated with SA WG5.

For the collection of OAM data, the NWDAF shall reuse existing mechanisms and interfaces defined by SA WG5. For OAM information exchange beyond existing mechanisms and interfaces defined by SA WG5, close co-operation with SA WG5 is needed.

Depending on network deployments and on AF(s), the AF may exchange information with the NWDAF via the NEF, or use the service based interfaces to access the NWDAF directly.

NWDAF accesses network data from data repositories (e.g., UDR).

For 5GC NFs, the NWDAF utilizes the service based interfaces to communicate to get network data and dedicated analytics.

Based on the aforementioned data collection, the NWDAF performs data analysis and provides the analytical result to the AF, the 5GC NFs and the OAM.

The output of the analytics provided to the AF, NFs, and OAM by the NWDAF and vice versa will be defined depending on the selected solutions for the key issues.

PRIOR ART

TR23.791, v1.1.0
5.2.9 Key Issue 9: Customizing Mobility Management Based on NWDAF Output
5.2.9.1 Description As introduced in the investigated use case 4, diverse service scenarios in 5G will introduce different requirements on mobility support, which requires on demand mobility management in 5G network, i.e., the 5G network should apply customized mobility management for UEs with different mobility and/or different usage patterns.

In this key issue, it is supposed that the NWDAF can provide UE mobility related analytical report based on analysis on historical UE location, UE mobility behaviours and so on. Then, it will be feasible for the 5GC to use the NWDAF analytical results on a UE to customize the mobility management applied to the UE.

In order to support customizing mobility management based on NWDAF output, following issues are required to be investigated:

1) What analytical results can be provided by the NWDAF for per UE mobility management optimization and what information is provided to the NWDAF (i.e., what information from the relevant 5GS NF(s) and/or OAM and/or the other AF(s) is provided to the NWDAF)?
   NOTE: This key issue is to discuss and list the potential information for the support of providing mobility related analytical report while data collection framework and how NWDAF collects the data is to be addressed by Key Issue 3: Interactions with 5GS NFs/AFs for Data Collection and/or Key Issue 4: Interactions with OAM for Data Collection and Data Analytics Exposure Data Collection Framework.

2) Which network function(s) can directly interact with the NWDAF to retrieve/receive the analytical results?

3) How to customize mobility management by NWDAF based outputs. Examples of potential areas of investigation for customized mobility management are: registration area allocation, paging handling, mobility restriction area handling, NAS signaling connection management, periodic registration timer handling, handover decisions, overload avoidance, RFSP index change.

SUMMARY OF INVENTION

Technical Problem

SA2 has studied the UE mobility customisation per UE under the Key Issue 9 during the Rel-16 eNA study (TR23.791 v2.0.0) agreeing solutions for UE registration area customisation based on analysis on historical UE location. However, the SA2 has also studied and agreed some solutions for optimizing connection management for the UE-NWDAF service operations should be enhanced to allow for providing statistics or predictions on communication patterns for the UE, as described in solution 22 (TR23.791 v2.0.0).

This proposal aims at further mobility and connection management optimizations for the UE based on the NWDAF analytics results.

Problem—What further analytical results can be provided by the NWDAF for per UE mobility and connection management optimisation. Then, how to customize the UE mobility and connection management by NWDAF based outputs. Examples of potential areas of investigation for customized mobility and connection are:

DRX/eDRX cycle lengths per UE customisation based on the analytics results from the NWDAF i.e. how to decide for the best DRX/.eDRX cycle length or PSM length per UE based on the analytics results from the NWDAF for that UE to achieve best power saving results. (problem 1);

back-off timers applicability and/or length per UE customisation based on the analytics results from the NWDAF i.e. how to decide whether to apply a back-off timer and if so with what length based on the analytics results from the NWDAF for that UE to avoid connection failures and allow for optimal load control. (problem 2);

UE analytics reporting customisation per UE in time, location and based on other considerations (problem 3).

Solution to Problem

According to an aspect of the present disclosure, a core network node includes: a controller configured to select a value for a back-off timer for mobility management for a user equipment (UE) based on a scheduled communication pattern of the UE.

According to another aspect of the present disclosure, a Network Data Analytic Function (NWDAF) node, includes: a transmitter configured to transmit, to a core network node, information for a scheduled communication pattern of a User Equipment (UE) for causing the core network node to select a value for a back-off timer for mobility management for the UE based on the scheduled communication pattern of the UE.

According to another aspect of the present disclosure, a method for a core network node, includes: selecting a value for a back-off timer for mobility management for a user equipment (UE) based on a scheduled communication pattern of the UE.

According to another aspect of the present disclosure, a method for a Network Data Analytic Function (NWDAF) node, includes: transmitting, to a core network node, information for a scheduled communication pattern of a User Equipment (UE) for causing the core network node to select a value for a back-off timer for mobility management for the UE based on the scheduled communication pattern of the UE.

Advantageous Effects of Invention

In certain aspects, a core network node, a NWDAF node, a method for a core network node, and a method for a NWDAF node may provide a technology for solving the problems as described above.

DESCRIPTION OF EMBODIMENTS

Aspect 1—NWDAF Analytics for UE Mobility and Connection Management Customization.

Example 1: NWDAF Analytics for Customised DRX/eDRX and PSM Per UE

Figure 1:
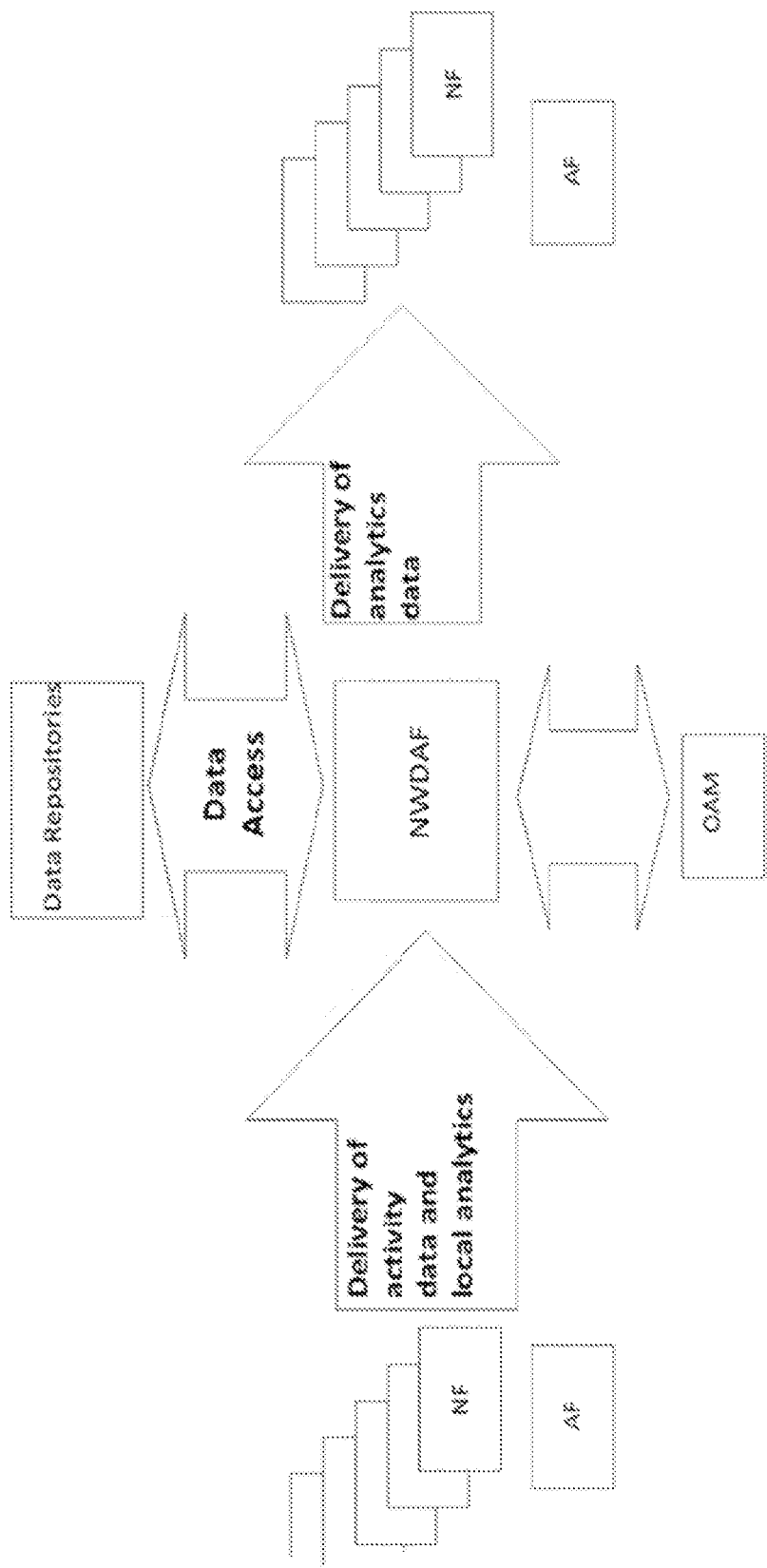
FIG. 1 shows general framework for 5G network automation.
Figure 2:
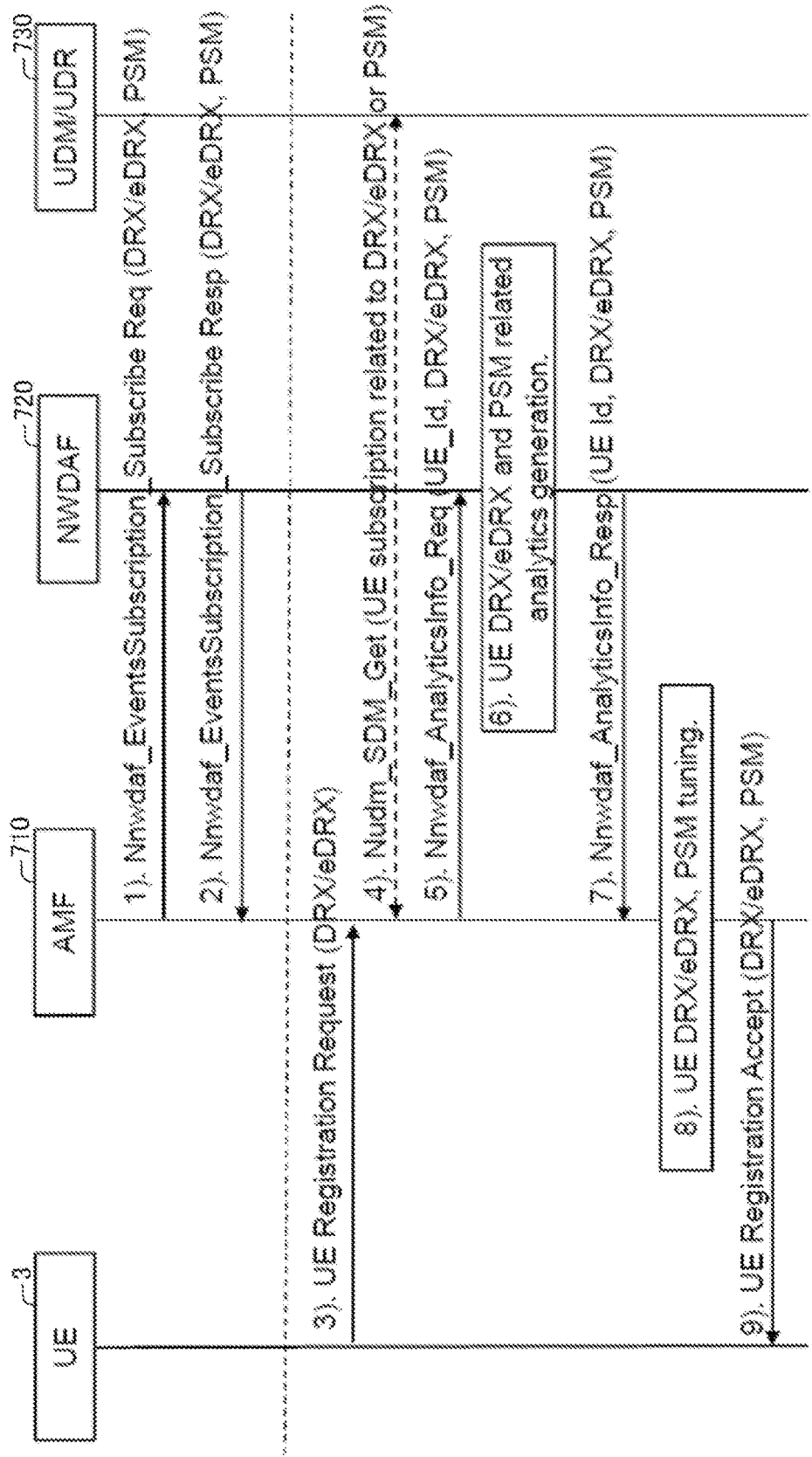
FIG. 2 shows an example of NWDAF analytics for customized DRX/eDRX and PSM per UE.

The Example 1 addresses the Problem 1, i.e., how to use the analytical output from the NWDAF 720 in order to customise the connection management per UE (e.g., DRX/eDRX and PSM per UE), see FIG. 2:

1-2) The AMF 710 subscribes for analytical results information from the NWDAF 720. The UE 3 may indicate the type of analytical information it is subscribing to, e.g., DRX/eDRX cycle and/or PSM analytics per UE. For example, these procedures may be invoked by a Nnwdaf_EventsSubscription_Subscribe Request procedure and a Nnwdaf_EventsSubscription_Subscribe Response procedure.

3) When the UE 3 registers with the network, the UE 3 requests DRX/eDRX. For example, this procedure may be invoked by a UE Registration Request procedure.

4) The AMF 710 may enquire with the UDM/UDR 730 for UE subscription information including subscription information related to the DRX/eDRX, the RAT being used and the PSM for this UE 3. For example, this procedure may be invoked by a Nudm_SDM_Get procedure.

5) The AMF 710 also requests analytical information from the NWDAF 720 for that UE 3 related to the DRX/eDRX and/or the RAT being used and/or the PSM. For example, this procedure may be invoked by a Nnwdaf_AnalyticsInfo_Request procedure where the AMF 710 includes the following parameters in the Nnwdaf_AnalyticsInfo_Request message:

UE_Id—UE identity for which analytics information is required from the NWDAF 720. The UE_Id may be represented by the UE's 5G-S-TMSI or SUPI or IMSI or SUCI or by any other form of the UE identity representation.

DRX/eDRX/PSM—this is to identify the type of the required analytics information from the NWDAF 720 related to the UE 3 whose UE_Id is included in the Nnwdf_AnalyticsInfo_Request message.

6) The NWDAF 720 collects statistical information for the UEs 3 from different sources e.g., directly from the UE 3, from other Network Functions (NFs), from the OAM and from the Service provider (AFs) via the network exposure, directly or via the NEF. When the NWDAF 720 is requested for analytical information by the AMF 710 related to the connection management (e.g., a customised per UE DRX/eDRX and/or RAT being used and/or PSM information), the NWDAF 720 analyses all the collected statistic and analytics information available for that UE 3 related to connection management, e.g., the frequency of mobile terminated (MT) calls, the frequency of mobile originated (MO) calls, is it a scheduled communications (e.g., the days and the time of the days the communication takes place), whether the UE 3 is battery powered UE and if so what the current level of the UE battery is, what type of S-NSSAIs the PDU connections are requested for (e.g., low priority applications, or delay tolerant applications) and etc.

Based on these inputs, the NWDAF 720 works out a proposal for the best DRX/eDRX cycle (e.g., longer DRX/eDRX cycle for the UEs 3 with requirement for power save and the UEs 3 with predominantly mobile originated traffic and for the UEs 3 that store delay tolerant applications) and the PSM length for that UE 3 (e.g., longer PSM interval for UEs 3 with communication pattern that suggest a rare communication or communication at specific times or for the UEs 3 with predominantly MO type of communication).

7) The NWDAF 720 provides the AMF 710 with a proposed DRX/eDRX cycle, RAN type and/or PSM interval. For example, this process may be invoked by a Nnwdaf_AnalyticInfo_Response procedure where the NWDAF 720 includes the following parameters in the Nnwdaf_AnalyticsInfo_Response message:

UE_Id—UE identity for which the analytics information is provided by the NWDAF 720. The UE_Id may be represented by the UE's 5G-S-TMSI or SUPI or IMSI or SUCI or by any other form of UE identity representation.

DRX/eDRX/PSM—this is to identify the type of the analytics information provided by the NWDAF 720 related to the UE 3 whose UE_Id is included in the Nnwdf_AnalyticsInfo_Response message.

8) The AMF 710 considers the DRX/eDRX requested by the UE 3 and the DRX/eDRX, RAN type and PSM length proposed by the NWDAF 720 (or the analytical results related to the DRX/eDRX and/or PSM for that UE 3), the UE subscription information related to the DRX/eDRX and PSM, the UE policy rules and operator configuration (if any), and based on all these and other inputs, the AMF 710 works out the DRX/eDRX and/or PSM customised for that UE 3. This way the AMF 710 is able to assign to the UE 3 a customised DRX/eDRX and/or PSM that are best suited for the UE 3 in terms of connection management, leading to:

UE power saving (e.g., due to assigning longer DRX/eDRX cycle and PSM interval to the UEs 3 with predominantly MO type of traffic and/or scheduled communication and/or with communication of delay tolerant type);

Reduced call delays (e.g., due to assigning shorter DRX/eDRX cycle and PSM interval to the UEs 3 with frequent type of communication pattern and/or with communication of predominantly MT type of calls);

Reduced data buffering in downlink (e.g., due to assigning shorter DRX/eDRX cycle and PSM interval to the UEs 3 with communication of predominantly MT type of calls and or with time sensitive communication).

9) The AMF 710 returns the per UE customised DRX/eDRX and/or PSM to the UE 3 with the Registration Accept message.

The 'per UE' customised DRX/eDRX cycle length and PSM length allow for:

UE power saving—if the analytic results from the NWDAF 720 reveal that the UE 3 is with predominantly MO type of traffic or with scheduled type of communication or the communication is of delay tolerant type, the AMF 710 may assign longer DRX/eDRX cycle or PSM length to the UE 3 with consideration of the schedule of communication (if scheduled type communication) so that the UE 3 can achieve best power saving results.

Reduced call delays—if the analytic results from the NWDAF 720 reveal that the UE 3 is with frequent type of communication pattern and/or with communication of predominantly MT type of calls, the AMF 710 may assign shorter DRX/eDRX cycle or PSM length to the UE 3 to reduce to minimum the delays in paging that UE 3.

Reduced downlink data buffering—if the analytic results from the NWDAF 720 reveal that the UE 3 is with communication of predominantly MT type of calls and or with time sensitive communication, the AMF 710 may assign a shorter DRX/eDRX cycle or PSM length to the UE 3 which would lead to reduced data buffering in downlink.

Example 2: NWDAF Analytics for Customised Back-Off Timers Per UE

Figure 3:
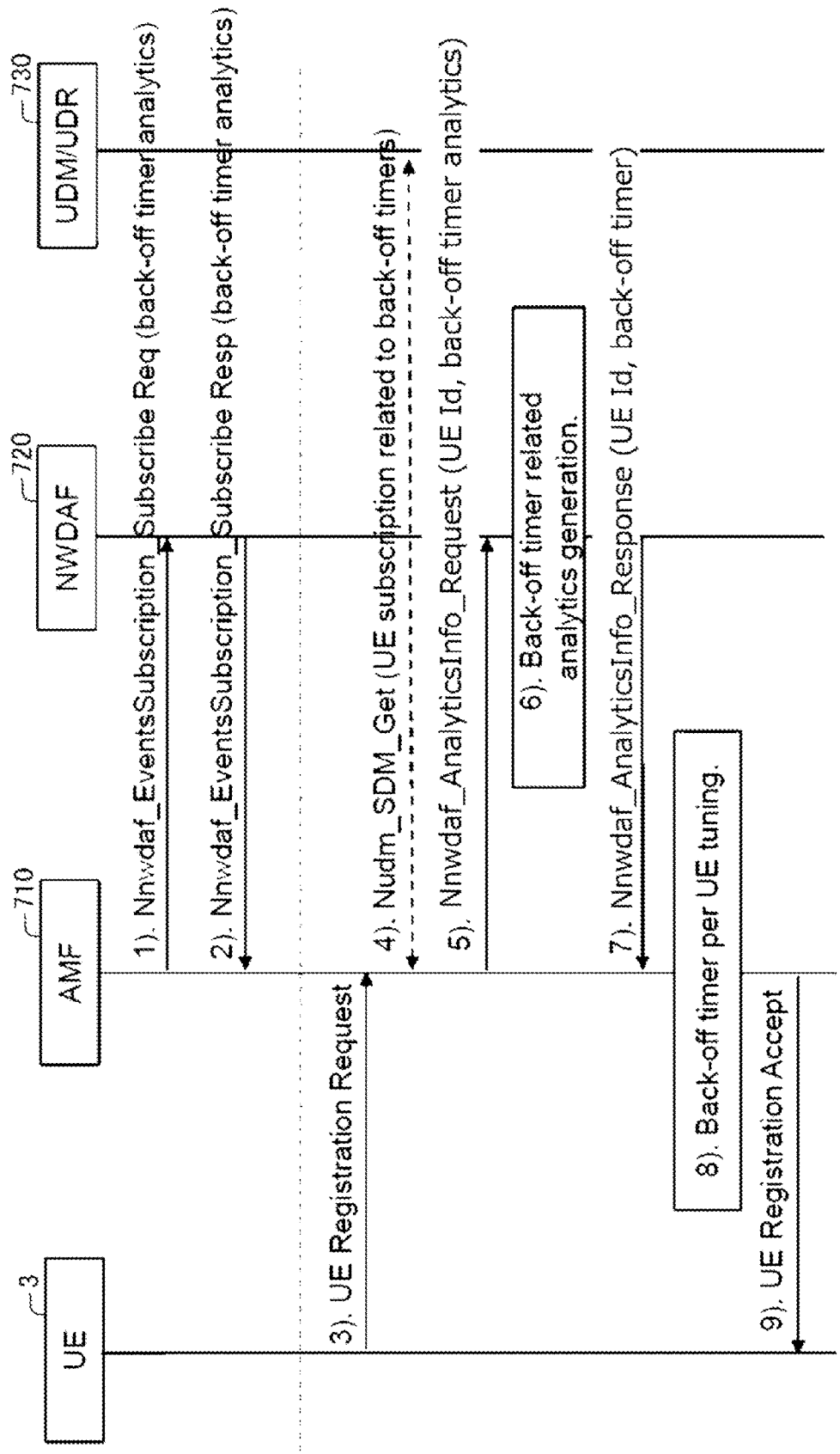
FIG. 3 shows an example of NWDAF analytics for customized back-off timer per UE.

The Example 2 addresses problem 2, i.e. how to use the analytical output from the NWDAF 720 in order to customise the connection management per UE (e.g., the overload control via customised back-off timers per UE). This aspect includes the following steps, see FIG. 3.

1-2) The AMF 710 subscribes for analytical results information from the NWDAF 720. The UE 3 may indicate the type of analytical information it is subscribing to, e.g., back-off timer analytics. For example, these procedures may be invoked by a Nnwdaf_EventsSubscription_Subscribe Request procedure and a Nnwdaf_EventsSubscription_Subscribe Response procedure.

3) The UE 3 registers with the network. For example, this procedure may be invoked by a UE Registration Request procedure.

4) The AMF 710 may enquire with the UDM/UDR 730 for UE subscription information including subscription information related to back-off timers for this UE 3. For example, this procedure may be invoked by a Nudm_SDM_Get procedure.

5) The AMF 710 requests analytical information from the NWDAF 720 related to the back-off timer to be used with that UE 3. For example, this procedure may be invoked by a Nnwdaf_AnalyticsInfo_Request procedure where the AMF 710 includes the following parameters in the Nnwdaf_AnalyticsInfo_Request message:
  UE_Id—UE identity for which the analytics information is required from the NWDAF 720. The UE_Id may be represented by the UE's 5G-S-TMSI or SUPI or IMSI or SUCI or by any other form of the UE identity representation.
  back-off timer analytics—this is to identify the type of the required analytics information from the NWDAF 720 related to the UE 3 whose UE_Id is included in the Nnwdf_AnalyticsInfo_Request message.

6) The NWDAF 720 collects statistical information for UEs from different sources e.g., directly from the UE 3, from other Network Functions (NFs), from the OAM and from the Service provider (AFs) via the network exposure, directly or via the NEF. When the NWDAF 720 is requested for analytical information by the AMF 710 related to the connection management (e.g., a customised per UE back-off timer), the NWDAF 720 analyses all the collected statistic and analytics information available for that UE 3 related to connection management, e.g., scheduled communications (e.g., the days and the time of the days the communication takes place), the length of the communication, whether the UE 3 is a battery powered UE, and etc.

Based on these inputs, the NWDAF 720 may work out a proposal indicating:
  whether it is appropriate for the network to apply a back-off timer for that UE 3 when the network is overloaded (e.g., if the analytical result from the NWDAF 720 reveals that the UE 3 does scheduled communication only, the NWDAF 720 may suggest the AMF 710 not to apply a back-off timer as the UE 3 would miss its communication time slot. Also, the UE 3 is battery powered and the battery level of the UE 3 is running low, the NWDAF analytical result may again suggest that this UE 3 is not applied a back-off timer.)

7) The NWDAF 720 provides the AMF 710 with an analytical result related to the back-off timer use and possibly the length of the back-off timer. For example, this process may be invoked by a Nnwdaf_AnalyticInfo_Response procedure where the NWDAF 720 includes the following parameters in the Nnwdaf_AnalyticsInfo_Response message:
  UE_Id—UE identity for which the analytics information is provided by the NWDAF 720. The UE_Id may be represented by the UE's 5G-S-TMSI or SUPI or IMSI or SUCI or by any other form of the UE identity representation.
  back-off timer analytics—this is to identify the type of the analytics information provided by the NWDAF 720 related to the UE 3 whose UE_Id is included in the Nnwdf_AnalyticsInfo_Response message.

8) The AMF 710 considers the back-off timer related proposal from the NWDAF 720 (or the analytical results related to the applicability of the back-off timer and possibly the length of the back-off timer) for that UE 3, the UE subscription information, and the UE policy rules configuration, and based on all these and other inputs, the AMF 710 may decide on:
  whether it is appropriate for the network to apply a back-off timer for that UE 3 when the network is overloaded, e.g., if the analytical result from the NWDAF 720 reveals that the UE 3 does scheduled communication only, the NWDAF 720 may suggest the AMF 710 not to apply a back-off timer as the UE 3 would miss its communication time slot in case the back-off timer would expire out of the UE allowed communication slot/window. Alternatively, the AMF 710 may apply a shorter back-off timer so that the UE 3 can retry before the end of its allowed communication window. Also, if the UE 3 is battery powered and the battery level of the UE 3 is running low, the NWDAF analytical results from the NWDAF 720 may again suggest that this UE 3 is not applied a back-off timer.
  what length of the back-off timer to apply, e.g., the NWDAF 720 may propose a length for the back off timer based on the analytical results that the communication from that UE 3 is scheduled communication and considering the timeslot for communication.

9) The AMF 710 returns to the UE 3 the Registration Accept message.

The back-off timer is assigned to the UE 3 with one of the NAS messages, e.g., Registration Accept message, Service Accept message, Service Reject message or any other NAS message.

Aspect 2—UE Analytics Report Policy (UEARP) Build Up, Delivery and Update.

Figure 4:
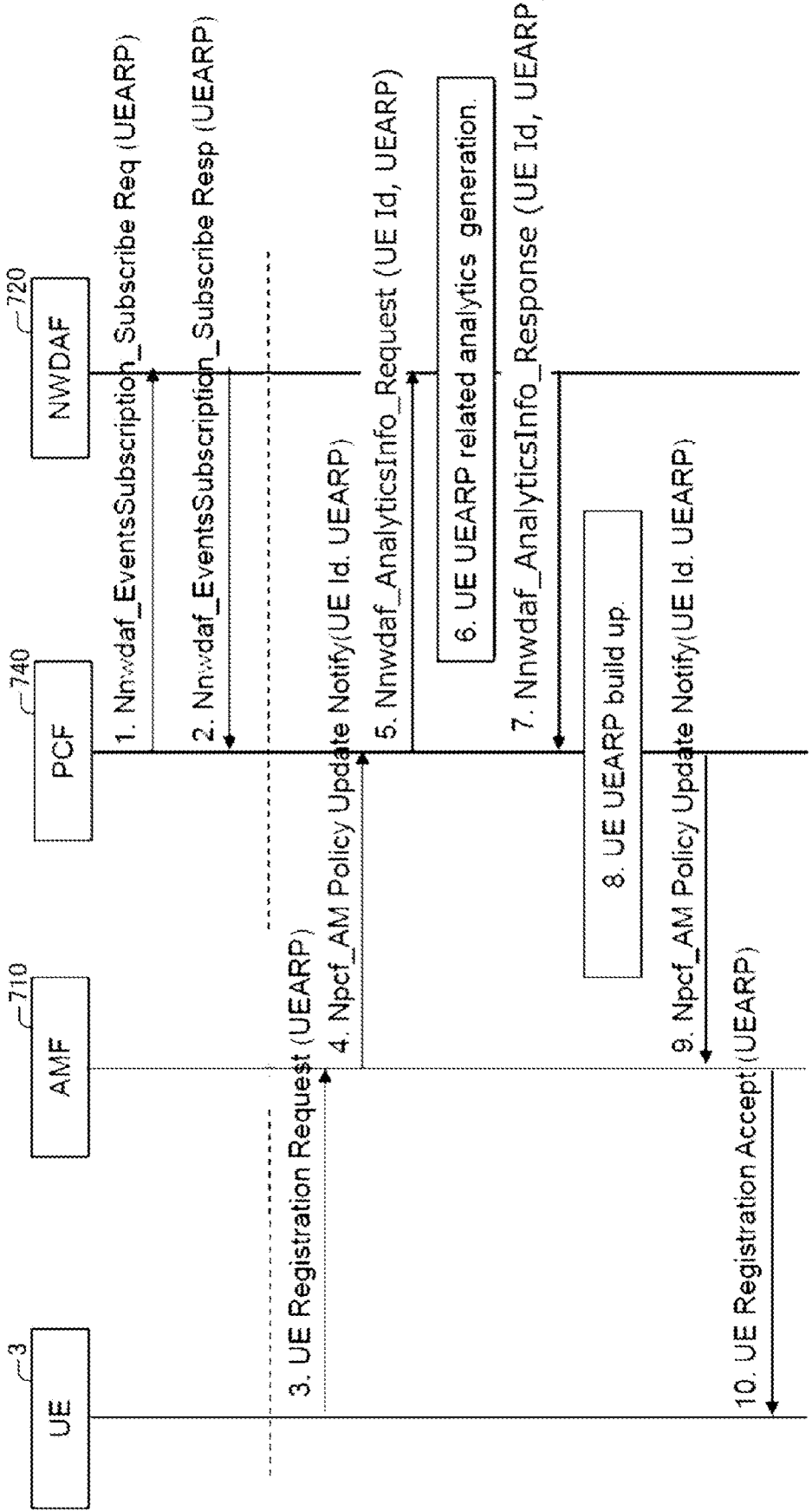
FIG. 4 shows an example of UE Analytics Report Policy (UEARP) build, delivery and update processing.

The Aspect 2 addresses problem 3. It is about configuration and management of the UE Analytics reporting. The Aspect 2 defines a UE Analytics Report Policy element (e.g., data structure with various rules for the UE Analytics reporting) that is built up by the PCF 740 based on analytics information from the NWDAF 720, subscription information and operators configuration policies, if any. Then, the UEARP is configured in the UE 3 during the UE registration procedure or via a UE Configuration update procedure. The UEARP is a set of UE analytics report policies which defines the rules for the UE analytics reporting, like what kind of analytics to be reported by the UE 3, when to report (e.g., triggers for reporting like entering defined locations, meeting defined requirements, time triggers and more). The Aspect 2 includes the following steps, see FIG. 4.

1-2) The PCF 740 subscribes for analytical results information from the NWDAF 720. The PCF 740 may use a UEARP parameter to set up the types of analytics it is subscribing to. For example, these procedures may be invoked by a Nnwdaf_EventsSubscription_Subscribe Request procedure and a Nnwdaf_EventsSubscription_Subscribe Response procedure.

3) The UE 3 triggers registration with the network. The UE 3 may include in the registration request message its current UEARP. For example, this procedure may be invoked by a UE Registration Request procedure.

4) The AMF 710 may enquire with the PCF 740 to check for any UEARP update. Alternatively, the AMF 710 may have been notified by the PCF 740 with the updated version of the UEARP for that UE 3. For example, this procedure may be invoked by a Npcf_AM Policy Update Notify procedure where the AMF 710 includes the following parameters in the Npcf_AM Policy Update Notify message:

UE_Id—UE identity for which checks for UEARP rules updates are required in the PCF 740. The UE_Id may be represented by the UE's 5G-S-TMSI or SUPI or IMSI or SUCI or by any other form of the UE identity representation.

UEARP—this is to identify the type of information required from the PCF 740. The UEARP may also contain the current UEARP rules reported by the UE 3 against which the PCF 740 shall check for any updates to the current UEARP rules for the UE 3 for which the UE_Id is included in the Npcf_AM Policy Update Notify message.

5) The PCF 740 requests analytical information from the NWDAF 720 for that UE 3 related to the UEARP. For example, this procedure may be invoked by a Nnwdaf_AnalyticsInfo_Request procedure where the PCF 740 includes the following parameters in the Nnwdaf_AnalyticsInfo_Request message:

UE_Id—UE identity for which the analytics information is required from the NWDAF 720. The UE_Id may be represented by the UE's 5G-S-TMSI or SUPI or IMSI or SUCI or by any other form of the UE identity representation.

UEARP—this is to identify the type of the required analytics information from the NWDAF 720 related to the UE 3 whose UE_Id is included in the Nnwdf_AnalyticsInfo_Request message.

6) Based on the analytical data collection and analysis by the NWDAF 720 for that UE 3, the NWDAF 720 works out a proposal for the UEARP for that UE 3.

7) The NWDAF 720 provides the PCF 740 with the UEARP analytics or with a proposal for the UEARP. For example, this process may be invoked by a Nnwdaf_AnalyticInfo_Response procedure where the NWDAF 720 includes the following parameters in the Nnwdaf_AnalyticsInfo_Response message:

UE_Id—UE identity for which the analytics information is provided by the NWDAF 720. The UE_Id may be represented by the UE's 5G-S-TMSI or SUPI or IMSI or SUCI or by any other form of the UE identity representation.

UEARP—this is to identify the type of the analytics information provided from the NWDAF 720 related to the UE 3 whose UE_Id is included in the Nnwdaf_AnalyticsInfo_Response message.

8) The PCF 740 updates the UE's UEARP based on the NWDAF proposed analytics result about the UEARP (or an UEARP proposal), UE subscription information and any available relevant operator policies. The PCF 740 may inform the proposed updates by the NWDAF 720 to the AF and/or the UDM 730 in order to synchronize data in each nodes. If the proposed updates by the NWDAF 720 is not acceptable by the AF and/or the UDM 730, the AF and/or the UDM 730 indicates it to the PCF 740. In this case, the PCF 740 does not update the UE's UEARP.

9) The PCF 740 may respond to the AMF 710 by sending the updated (if any) UEARP. For example, this procedure may be invoked by a Npcf_AM Policy Update Notify procedure where the PCF 740 includes the following parameters in the Npcf_AM Policy Update Notify message:

UE_Id—UE identity for which UEARP rules (new or updated) are provided from the PCF 740. The UE_Id may be represented by the UE's 5G-S-TMSI or SUPI or IMSI or SUCI or by any other form of the UE identity representation.

UEARP—the UEARP rules (new or updated) provided from the PCF 740 for the UE 3 for which the UE_Id is included in the Npcf_AM Policy Update Notify message.

10) The AMF 710 delivers the updated (if any) UEARP to the UE 3 with the Registration Accept message. The updated UEARP may also be delivered to the UE 3 via the UE Configuration Update message.

In another implementation, the UEARP rules can also be delivered as part of the UE Policy during the Registration procedure or via the UE Configuration Update message.

The UE configuration and update with the UEARP rules allows for the network (e.g., operator or service provider) to control and manage the UE analytics reporting from the UE 3, like what type of analytics to be reported by the UE 3, when to report (e.g., triggers for reporting like entering defined locations, meeting defined requirements, time triggers and more). This allows for reporting only of UE analytics that is required and reporting at the time they are required which leads to savings in the UE power, saving in the UE 3 and network resources and reduced signalling between the UE 3 and the network.

Some exemplary UE Analytics Report Policy (UEARP) rules are shown in Table 1.

TABLE 1

UEARP rules

| UEARP rule ID | UEARP event filter | Description |
| --- | --- | --- |
| Location triggered reporting | Cell, list of Cells, TA, list of TAs, Registration Area | The PCF request the UE to start UE analytics reporting when the UE enters a location defined by the UEARP event filter. |
| Time triggered reporting | Defined times per day/week/month, Length of reporting timeslot | The PCF requests the UE to start UE analytics reporting at specific times of the day or week or month set by the UEARP event filter. The PCF may also define the length of reporting time. |
| Event triggered reporting | Designated message or parameter received by the network | The PCF triggers the UE to start UE analytics reporting by sending a designated message or a designated parameter in an existing message. |
| Scheduled reporting | Defined timeslot per day/week/month, Length of reporting timeslot | The PCF requests the UE to start UE analytics reporting at specific timeslots of the day or week or month set by the UEARP event filter. The PCF may also define the length of reporting time. |
| Reporting data set | The type of the reported analytics data (e.g. UE location, UE mobility, UE serving cell signal strength, UE out of service entries, UE call drops and etc) | The PCF requests the UE to start UE analytics reporting for a set of UE analytics data defined by the UEARP filter. |

Summary

Beneficially, the above described aspects include, although they are not limited to, one or more of the following functionalities:

Aspect 1:
1) The AMF 710 subscribes for and gets analytics results from the NWDAF node 720 in order to improve and optimise the mobility and connection management of the UE 3 by providing the UE 3 with:
    Per UE customised DRX/eDRX and PSM.
    Per UE customised back-off timer.

Aspect 2:
2) Defines a UE Analytics Report Policy (UEARP) element as a set of UE analytics reporting policies which defines the rules for the UE analytics reporting, like what kind of analytics to be reported by the UE 3, when to report (e.g., triggers for UE analytics reporting like location triggered reporting, time triggered reporting, event triggered and more.

In order to provide these functionalities, the above aspects describe exemplary methods comprising (at least some of) the following steps:

Aspect 1:

Example 1

1) AMF subscription for DRX/eDRX and PSM related NWDAF analytics results
2) DRX/eDRX cycle and PSM customisation per UE based on the analytical results from the NWDAF 720 and the UDM/UDR 730.

Example 2

1) AMF subscription for back-off timer related NWDAF analytics results
2) Back-off timer customisation per UE based on the analytical results from the NWDAF 720 and the UDM/UDR 730.

Aspect 2:
1) PCF subscription with the NWDAF 720 for UE Analytics Report Policy (UEARP) related analytical results.
2) The PCF 740 defines UEARP per UE.
3) UEARP delivery to UE 3 in the registration procedure or via the UE Configuration Update procedure.

Benefits

This document proposes how the AMF 710 and the PCF 740 can use the analytics result from the NWDAF 720 to improve the UE mobility and connection management by working out customised per UE DRX/eDRX, PSM, back-off timer and UE Analytical Report Policy.

System Overview

Figure 5:
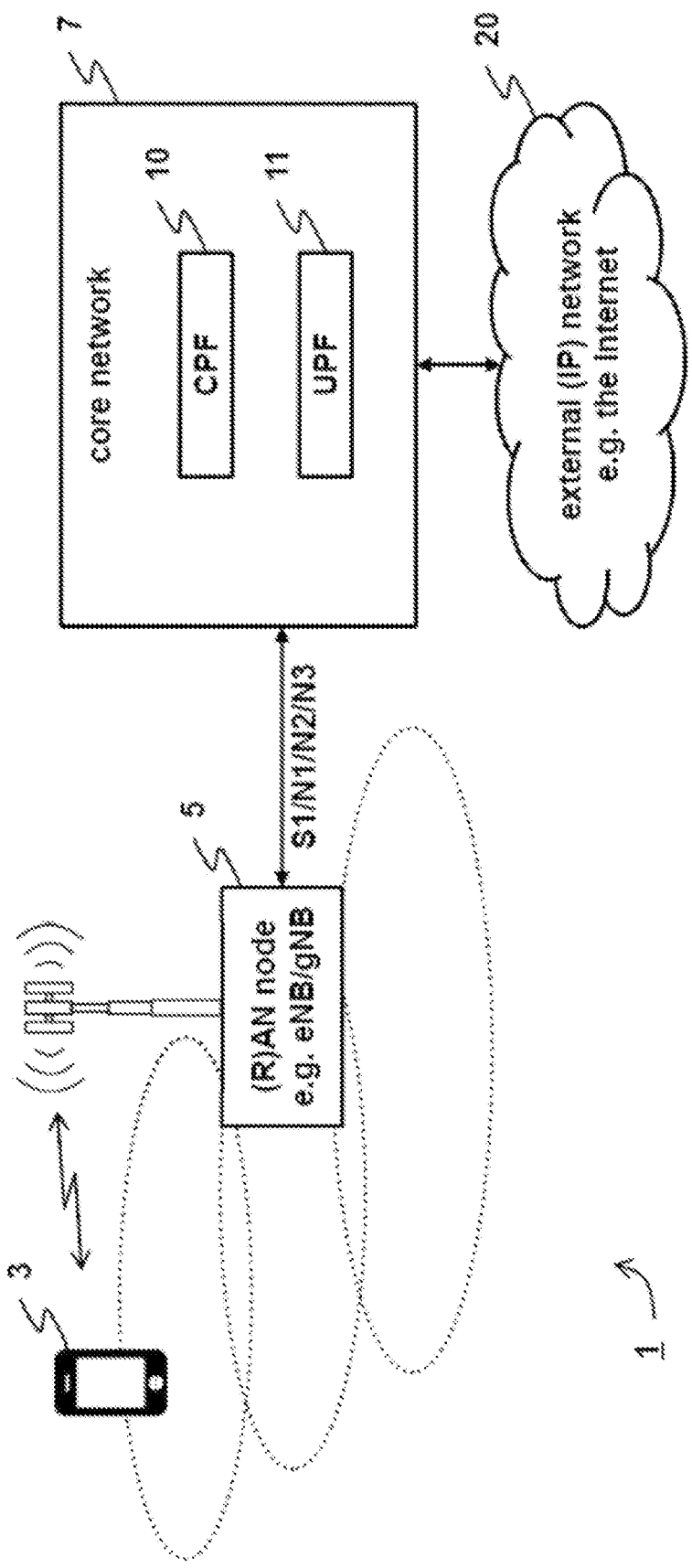
FIG. 5 schematically illustrates a mobile telecommunication system 1.

FIG. 5 schematically illustrates a mobile (cellular or wireless) telecommunication system 1 to which the above aspects and examples are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 5 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). The base station 5 that supports E-UTRA (Evolved Universal Terrestrial Radio Access)/4G protocols may be referred to as an 'eNB' (evolved NodeB) and a base station 5 that supports NextGeneration/5G protocols may be referred to as a 'gNBs' (next generation NodeBs). It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes 10, 11 via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. Such control plane functions 10 (and user plane functions 11) may provide the functionality of the AMF 710, the NWDAF 720, the UDM/UDR 730, the PCF 740, and/or the OAM discussed in the above aspects.

From the core network 7, connection to an external IP network 20 (such as the Internet) is also provided.

The components of this system 1 are configured to perform the above described aspects.

User Equipment (UE)

Figure 6:
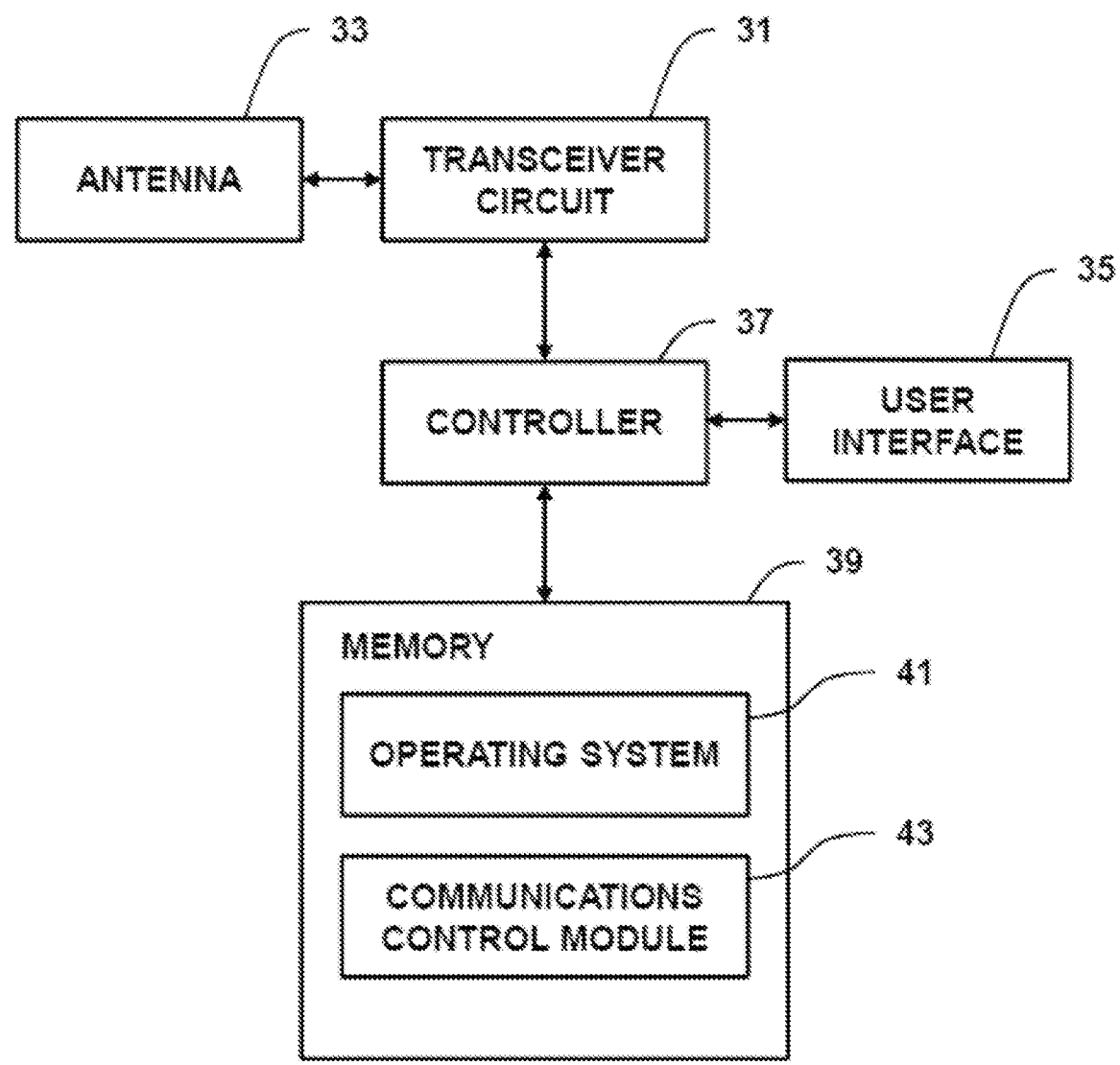
FIG. 6 is a block diagram illustrating, in more detail, the main components of the UE.

FIG. 6 is a block diagram illustrating, in more detail, the main components of the UE (mobile device 3) shown in FIG. 5. As shown, the UE 3 includes a transceiver circuit 31 which is operable to transmit signals to and to receive signals from the connected node(s) via one or more antenna 33. Although not necessarily shown, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages, including uplink/downlink data packets, between the UE 3 and other nodes (e.g., (R)AN nodes 5 and core network nodes 10, 11), in accordance with any one of the above described aspects.

(R)AN Node

Figure 7:
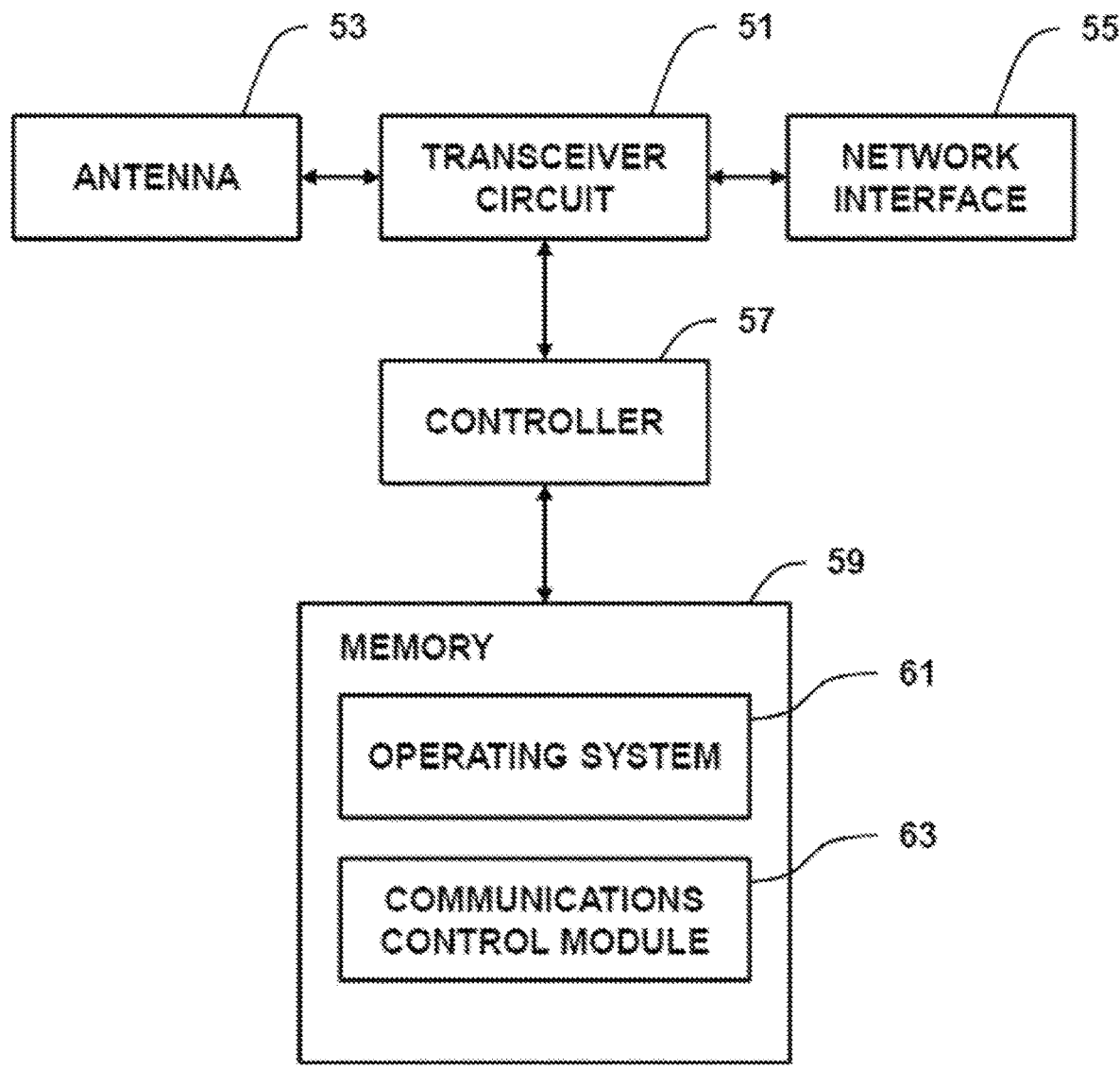
FIG. 7 is a block diagram illustrating, in more detail, the main components of an exemplary (R)AN node.

FIG. 7 is a block diagram illustrating, in more detail, the main components of an exemplary (R)AN node 5 (base station 5) shown in FIG. 5. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59.

The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes 10, 11/network elements. Such signalling includes appropriately formatted messages (and information elements thereof) in accordance with any one of the above described aspects.

Core Network Node

Figure 8:
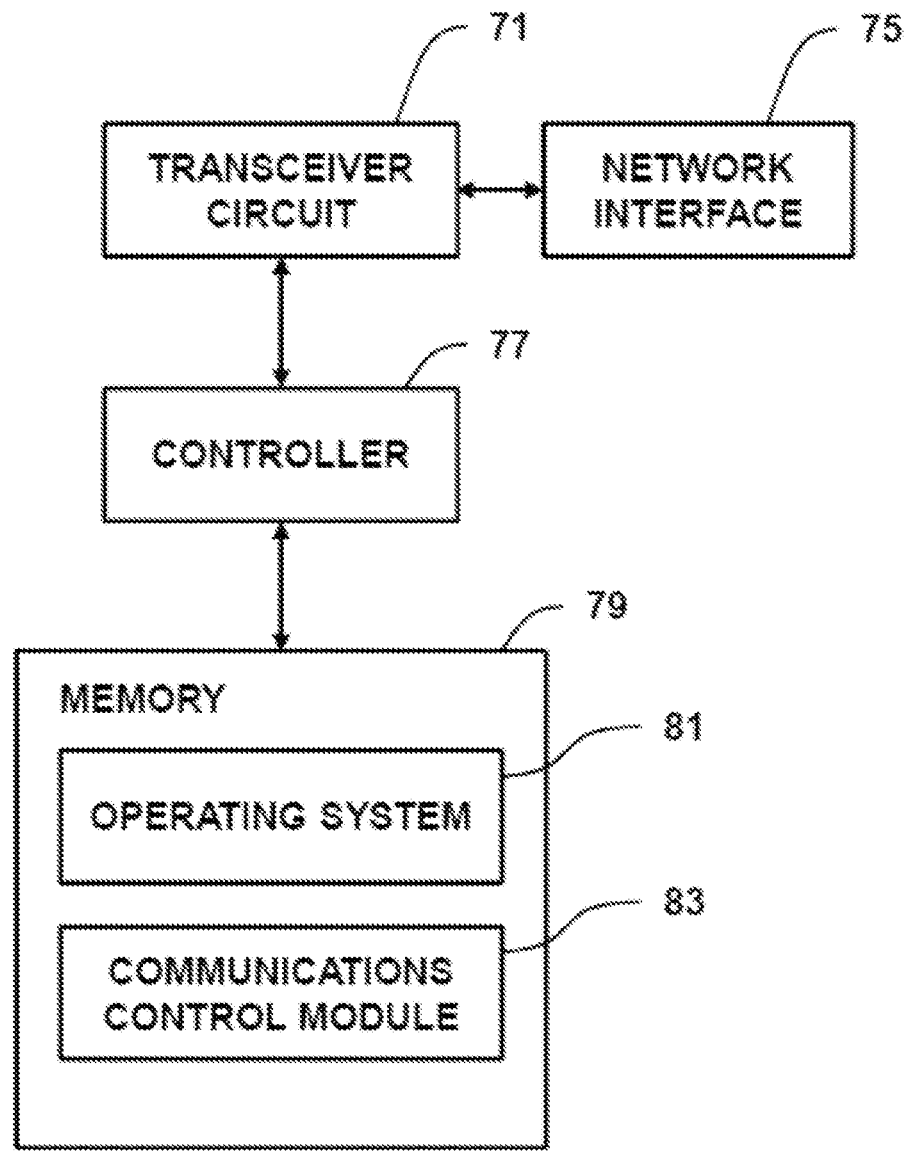
FIG. 8 is a block diagram illustrating, in more detail, the main components of a generic core network node.

FIG. 8 is a block diagram illustrating, in more detail, the main components of a generic core network node 10, 11 (network element or function) shown in FIG. 5. It will be appreciated that this block diagram may also apply to network nodes outside the core network 7, e.g., the OAM. As shown, the core network node 10, 11 includes a transceiver circuit 71 which is operable to transmit signals to and to receive signals from other nodes (including the UE 3 and the (R)AN node 5) via a network interface 75. A controller 77 controls the operation of the core network node 10, 11 in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node 10, 11 and other nodes, such as the UE 3, (R)AN node 5, and other core network nodes 10, 11. Such signaling includes appropriately formatted messages in accordance with any one of the above described aspects.

MODIFICATIONS AND ALTERNATIVES

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g., control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or uncompiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above aspects are also applicable to 'non-mobile' or generally stationary user equipment.

Various other modifications will be apparent to those skilled in the art and will not be described in further detail here.

CITATION LIST

Non Patent Literature

[NPL 1] 3GPP TR 21.905: "Vocabulary for 3GPP Specifications" V15.0.0 (March 2018)
[NPL 2] 3GPP TS 23.501: "System Architecture for the 5G System; Stage 2" V15.3.0 (September 2018)—http://www.3gpp.org/ftp/Specs/archive/23 series/23.501/23501430.zip
[NPL 3] 3GPP TS 23.502: "Procedures for the 5G System; Stage 2" V15.3.0 (September 2018)—http://www.3gpp.org/ftp/Specs/archive/23 series/23.502/23502-f30.zip
[NPL 4] 3GPP TR23.791 "Study of Enablers for Network Automation for 5G" V2.0.0 (December 2018)—http://http://www.3gpp.org/ftp/Specs/archive/23 series/23.791/23791-200.zip This application is based upon and claims the benefit of priority from European patent application No. 19151050.2, filed on Jan. 9, 2019, the disclosure of which is incorporated herein in its entirely by reference.

REFERENCE SIGNS LIST 1 telecommunication system
3 UE
31 transceiver circuit
33 antenna
35 user interface
37 controller
39 memory
41 operating system
43 communications control module
5 (R)AN node
51 transceiver circuit
53 antenna
55 network interface
57 controller
59 memory
61 operating system
63 communications control module
7 core network
71 transceiver circuit
75 network interface
77 controller
79 memory
81 operating system
83 communications control module
710 AMF 720 NWDAF
730 UDM/UDR
740 PCF
10 CPF
11 UPF
20 external IP network

What is claimed is:

1. A core network node comprising:
a memory storing instructions; and
at least one processor configured to process the instructions to:
send, to a Network Data Analytic Function (NWDAF) node, an Nnwdaf_AnalyticsInfo Request message comprising: first information, indicating a type of analytics information, and second information, indicating a Subscription Permanent Identifier (SUPI) for the analytics information, and
after the NWDAF node performs data analytics on communication pattern for a
User Equipment (UE) based on the Nnwdaf_Analytics-Info_Request message, receive, from the NWDAF node, an Nnwdaf_AnalyticsInfo_Response message comprising:
requested analytics results comprising the first information and the second information; wherein the at least one processor is further configured to process the instructions to:
select a value for a back-off timer for mobility management for the UE based on a communication pattern of the UE.

2. A Network Data Analytic Function (NWDAF) node comprising:
a memory storing instructions; and
at least one processor configured to process the instructions to:
receive, from a core network node, an Nnwdaf_AnalyticsInfo Request message comprising: first information, indicating a type of analytics information, and second information, indicating a Subscription Permanent Identifier (SUPI) for the analytics information,
perform data analytics on a communication pattern for a User Equipment (UE) based on the Nnwdaf_AnalyticsInfo Request message, and
send, to the core network node, an Nnwdaf_AnalyticsInfo_Response message comprising requested analytics comprising the first information and the second information; wherein the at least one processor is further configured to process the instructions to:
select a value for a back-off timer for mobility management for the UE based on a communication pattern of the UE.

3. A method for a core network node, the method comprising:
sending, to a Network Data Analytic Function (NWDAF) node, an Nnwdaf_AnalyticsInfo Request message comprising: first information, indicating a type of analytics information, and second information, indicating a Subscription Permanent Identifier (SUPI) for the analytics information; and
after the NWDAF node performs data analytics on a communication pattern for a User Equipment (UE) based on the Nnwdaf_AnalyticsInfo Request message, receiving, from the NWDAF node, an Nnwdaf_AnalyticsInfo Response message comprising requested analytics results comprising the first information and the second information;
further comprising:
selecting a value for a back-off timer for mobility management for the UE based on the communication pattern of the UE.

4. A method fora Network Data Analytic Function (NWDAF) node, the method comprising:
receiving, from a core network node, an Nnwdaf_AnalyticsInfo Request message comprising: first information, indicating a type of analytics information, and second information, indicating a Subscription Permanent Identifier (SUPI) for the analytics information;
performing data analytics on a communication pattern for a User Equipment (UE) based on the Nnwdaf_AnalyticsInfo Request message; and
sending, to the core network node, an Nnwdaf_AnalyticsInfo Response message comprising requested analytics results comprising the first information and the second information;
further comprising:
selecting a value for a back-off timer for mobility management for the UE based on the communication pattern of the UE.

* * * * *